Jan. 7, 1930.  M. A. ROSENBERG  1,742,878
BEVERAGE STIRRER
Filed March 26, 1929  2 Sheets-Sheet 1
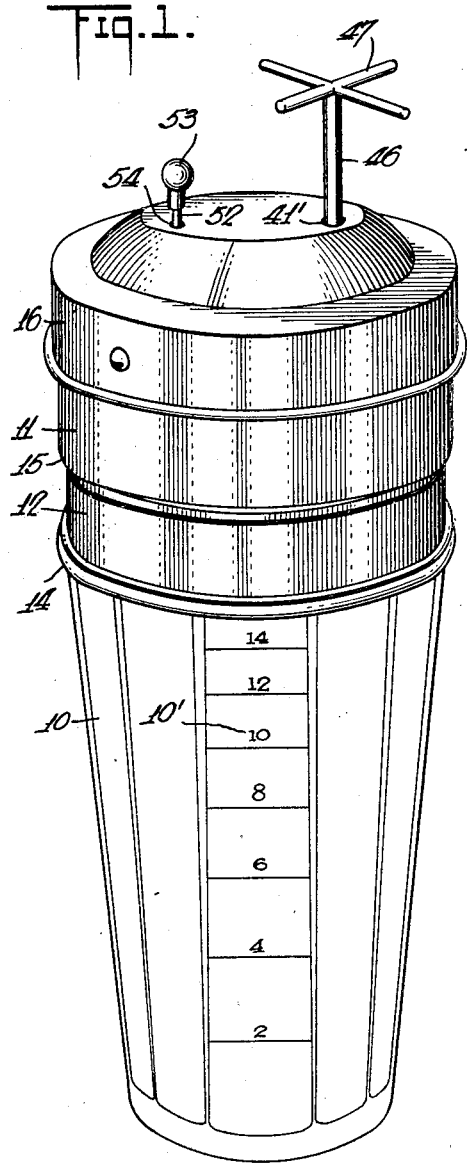
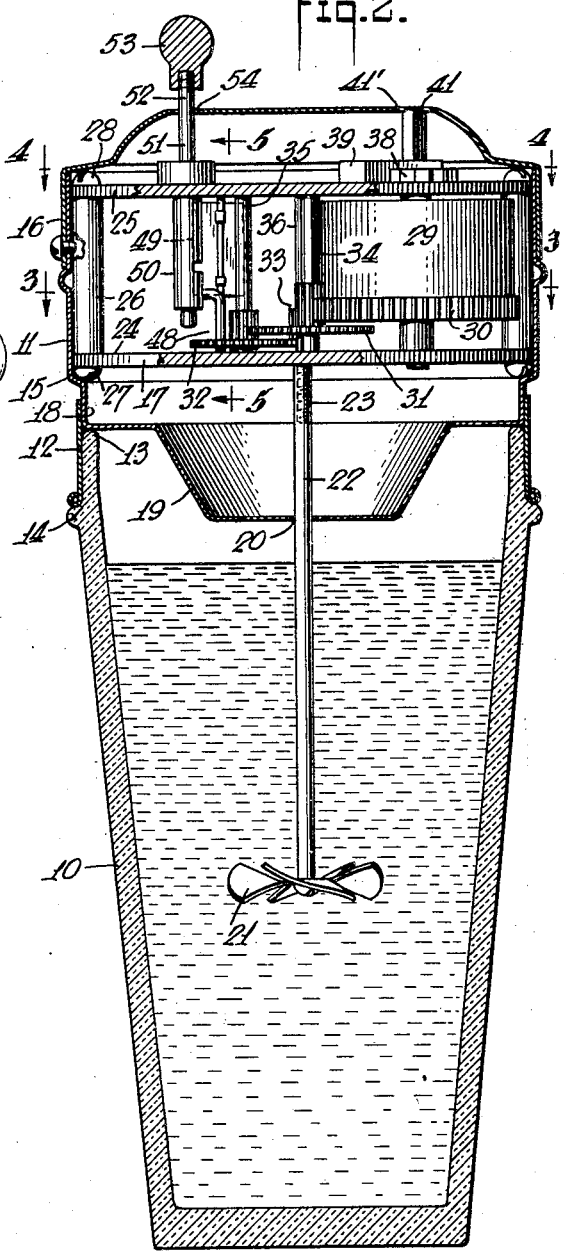
INVENTOR
Max A. Rosenberg
BY
his ATTORNEY Jan. 7, 1930.   M. A. ROSENBERG   1,742,878
BEVERAGE STIRRER
Filed March 26, 1929    2 Sheets-Sheet 2
Fig.3.
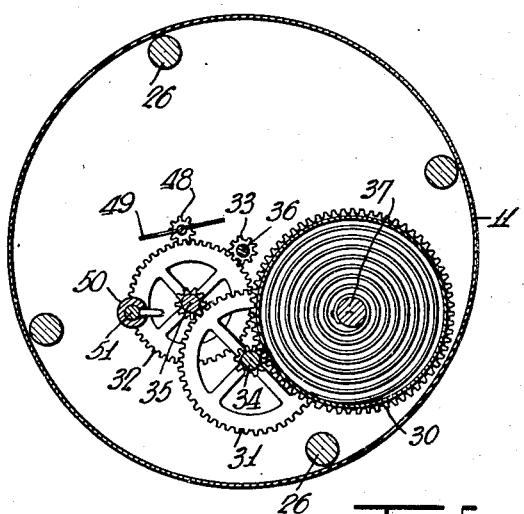
Fig.4.
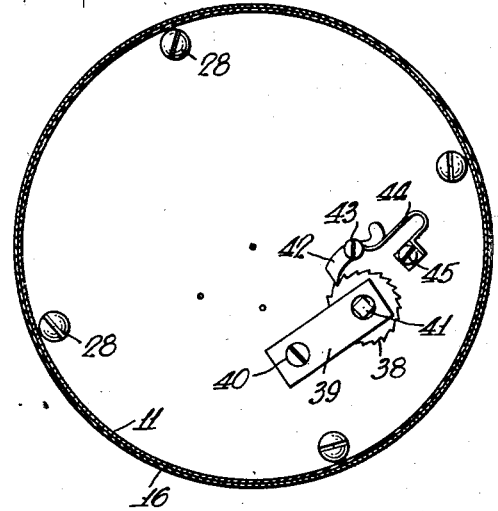
Fig.5.   Fig.6.
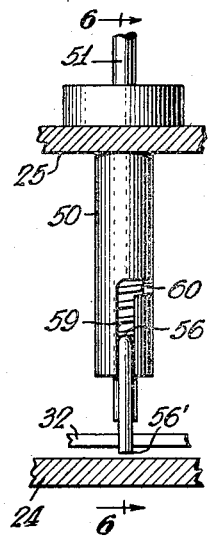 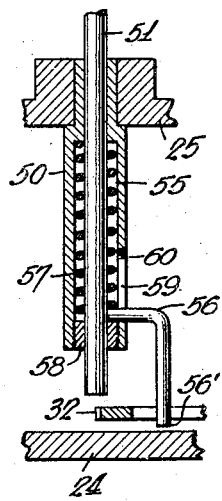
INVENTOR
Max A. Rosenberg
BY
his ATTORNEY Patented Jan. 7, 1930

1,742,878

UNITED STATES PATENT OFFICE

MAX A. ROSENBERG, OF BROOKLYN, NEW YORK, ASSIGNOR OF ONE-FOURTH TO BENJAMIN BURKE KASLOFF, OF BROOKLYN, NEW YORK

BEVERAGE STIRRER

Application filed March 26, 1929. Serial No. 349,938.

This invention relates to a stirring device for beverages.

It is an object of my invention to provide a stirring device for beverages, such as milk or iced beverages, whereby intimate mixtures of concoctions may be prepared with facility and ease. It is contemplated by my invention to provide a stirring device, mixer or shaker which is portable and may be used independent of electrical current and which will speedily and completely prepare a mixture compounded from materials, such as milk, syrup and enriching agents, such as "malted milk" and the like, whereby smooth and finely textured beverages may be made from ingredients normally not readily miscible. It is further contemplated by my invention to provide a beverage dispensing device which cooperatively serves as the means for mixing various ingredients of a concoction, such as malted drinks, iced drinks and the like which may, at the same time, be used as a shaker or similar beverage mixing contrivance.

Other objects of my invention reside in the provision of a stirring device cooperatively serving as a beverage dispensing vessel which is portable and utilizable independent of motive power, such as electricity, so that the same may be carried about and used where electrical current is not available, to prepare a beverage. Thus, it is contemplated by my device to prepare a stirring or mixing device whereby such dry materials as powdered milk, cocoa and sugar may be carried about and be compounded into a palatable beverage by the addition of water and by intimate admixture, using the apparatus contemplated by my invention. Thus, by my invention, dry materials may be stored by a traveller, picnicker or camper and at places where motive power is not available, and merely by the addition of water, the dry materials may be formed into a beverage comprising the full equivalents of milk or the like. It is further contemplated by my invention to provide a stirring device in the nature of a shaker wherein the usual operations in mixing and compounding ingredients may be facilitated by the addition of a rotatable stirring device, thus hastening the mixing operation incident to shaking by a mechanical stirring device.

Still further objects of my invention reside in the provision of a stirring device which is sanitary, neat, compact and takes up no greater space than a beaker or similar drinking receptacle but which may be utilized to compound various mixtures, such as milk, malted milk, cocoa, iced drinks or the like.

To attain these objects and such further objects as may appear herein or be hereinafter pointed out, I make reference to the accompanying drawing forming a part hereof, in which—

Figure 1 is a perspective view showing my device;

Figure 2 is a longitudinal section taken on the line 2—2 of Figure 1;

Figure 3 is a section taken on the line 3—3 of Figure 2;

Figure 4 is a section taken on the line 4—4 of Figure 2;

Figure 5 is a detailed sectional view taken on the line 5—5 of Figure 2;

Figure 6 is a section taken on the line 6—6 of Figure 5.

Making reference to the drawing, it will be observed that my device comprises generally a receptacle 10, preferably made of glass, in the form of a drinking beaker and a closure 11, centered and snugly fitting thereon by the aid of a ferrule 12, tightly fitting on the edge 13 of the receptacle and abutting against the flange 14 formed on the exterior of the receptacle. The closure 11 is in the form of a housing comprising a complemental lower section 15 and a cover member 16, within which there is disposed a spring motor assembly 17. The lower section 15 is formed with offset flanges 18 and 19, the former serving to fit snugly within the ferrule 12 previously described, to thus seat the housing in the nature of a cap within the ferrule 12, the edge 13 of the vessel serving as a stop and seat for the housing. The lower offset portion 19 is disposed for a substantial distance to the interior of the vessel and through the central portion there is formed an orifice 20, through which there is extended the stirrer 21, mounted upon the shaft 22 and connected with the drive of the spring motor by screw engagement at 23. The form of the offset device is such that in rapid rotation it would serve as a baffle or guide for the current of the beverage as it is raised by the stirring device, to deflect the same sidewardly, thereby also guiding the ascending liquid away from the orifice 20, through which the shaft 22 passes. The offset portion from which the flange 18 is formed serves to form a stop for the spring motor assembly, which comprises spaced disks 24 and 25, held in this relationship at the spacing rods 26, by the set screws 27 and 28, serving to engage the disks to the rods by orifices provided therefor.

Between the disks 24 and 25 there is journaled a spring housing 29, provided with a drive gear 30, connected with a train of gears 31, 32 and 33, mounted on the shafts 34, 35 and 36, respectively. These shafts have suitable bearings in the plates 24 and 25, respectively. The shaft 36 is disposed through an orifice in the lower disk, at which end there is provided screw threading means engaging the shaft 22. The spring within the housing 29 is anchored to the loose shaft 37, which is disposed above the upper disk 25 and is provided with a ratchet wheel 38, between the end bearing spring 39, which is held in position by the set screw 40. The ratchet wheel 38 is keyed upon the shaft 37 and this is preferably accomplished by squaring the shaft 37, at 41. A pawl 42, pivoted by the screw at 43, is pressed into engagement with the ratchet wheel by the spring 44, anchored by the screw at 45. A winding key 46, having cross arms 47, serves to engage the squared shaft 41 for rotating the shaft 37, and thereby serving to wind or tension the spring within the housing 29. The operation is of the usual spring motor type whereby the end of the spring affixed to the shaft 37 remains stationary after winding or tightly coiling the spring, the opposite end of the spring serving to rotate the housing, which carries with it the gear 30. The gear rotated by the spring will be restrained from rapidly moving by the train of gears previously described and this is so chosen as to give rapid rotation to the shaft 36 at the end of the train.

I may, for purposes of avoiding dissipation of the power through the spring motor provide a braking fan 48, mounted upon the shaft 49 and geared to the gear 32, for purposes which will become apparent as this description proceeds. Connected with the gear 32, which is next to the end of the train, I provide a starting and stopping member 50. This preferably comprises a hollow shaft fixed in the upper disk 25 and through which there is disposed an operating rod 51, provided at its free end 52 with a button or knob 53, extending beyond the section 16, through an orifice 54. The lower end of the rod 51 is disposed through the enlarged orifice 55 of the member 50 and from one side thereof, angularly disposed, there is affixed a right angularly formed finger member 56. This passes sidewardly from the member 50 and between the point of attachment to the rod 51 and the upper part of the housing 55, there is disposed a coiled spring 57, serving to outwardly direct the finger 56 and the rod 51, which serves to carry it. I may screw thread a stop 58 at the very end of the orifice 55, which also serves as a bearing for the lower end of the rod. The angularly disposed finger 56 is held from rotation by the slotted wall 59, the upper end of which, however, is given a slight angular bend at 60, for purposes which will now become apparent.

It will be observed that the rod 51 may be pulled upwardly along the length of the slot 59 and its movement is so governed that the end of the finger 56' may be disposed between the spokes of the gear 32 in the extreme downward movement, thus serving as a positive brake for this gear.

The rod 51 may be moved upwardly until the horizontally disposed angle abuts the slot 60. A slight counter-clockwise movement will serve to dispose the upper branch within the slot 60 and prevent its being displaced along the slot 59 by the action of the spring within the housing 55. When the finger is so raised and the spring motor has been wound, the shaft 36 will be freely rotated to the full energy of the spring motor. It is preferred to apply the brake mechanism upon substantially the last gear of the train so that the maximum braking action is obtained upon the gear directly keyed to the housing 29. Thus it will be observed that for purposes of preparing a beverage, the spring motor is wound to the desired tension, utilizing the key 46, which may engage the squared portion of the shaft 41 previously described and for this purpose upper end of the housing is suitably orificed at 41 and the key readily disengaged from the shaft during operation. During winding of the motor, it is preferred that the finger stopping mechanism be disposed so that the end 56' of the finger 56 is in the downward position and between the spokes of the gear 32, thus restraining any movement of the train of gears. The mixture which is to be compounded may then be deposited within the receptacle by lifting the entire housing from the ferrule 12, depositing the liquid in quantity as desired and indicated by the markings 10', preferably molded in the glass. The stirrer associated with the housing is then replaced upon the ferrule 12 on the edge of the vessel 13, serving in the nature of a cap or closure. In this position, the knob 53 is grasped and pulled upwardly against the tension of the spring 57, drawing with it the finger 56, disengaging the end 56' thereof from the spokes of the gear 32. Under these conditions, the stirrer 21 will be rapidly rotated, a uniform rotation thereof being obtained by the restraining action of the braking fan. The spring motor is so chosen in respect to the vessel so that the stirring action will be of a duration sufficient for efficiently mixing the ingredients deposited within the vessel.

Under this condition of operation, the entire device is freely portable and the stirring action may be enhanced by shaking the entire contrivance, obtaining the combined effect of shaking and stirring, if so desired. It wil be observed that no additional stand or fixture is necessary for maintaining the stirring mechanism in position so that in addition to the fact that no manual operation is necessary, the device is not dependent upon electrical current for operation. Also, the housing serves as an efficient means to circulate the liquid which is stirred within the vessel as well as a closure for the vessel during the stirring operation or shaking, if this additional means is utilized to effect the mixing. In this way, it will be observed that I have provided an efficient, as well as portable stirring device.

Having thus described my invention and illustrated its use, what I claim as new and desire to secure by Letters Patent, is—

1. A beverage mixing apparatus including a vessel, a stirrer and motor driving means therefor, a closure for said vessel forming a housing for said motor and formed at its lower portion with spaced flanged offsets, one to support said motor and engage the mouth of the vessel for supporting the housing and motor thereon, the other offset flange being disposed interiorly of said vessel and formed about said stirrer to provide a baffle for the liquid within the vessel as it ascends in the stirring action.

2. A beverage mixing apparatus including a vessel, a stirrer and motor driving means therefor, a closure for said vessel forming a housing for said motor and formed with spaced flanged offsets, one to support said motor and engage the mouth of the vessel for supporting the housing thereon, the other offset flange being disposed interiorly of said vessel and formed about said stirrer to provide a baffle for the liquid within the vessel as it ascends in the stirring action, siad vessel being formed with a ferrule engaging the mouth thereof and serving as frictional mounting for said housing, engaging one of the aforementioned offsets formed on the housing.

In witness whereof I have hereunto affixed my name this 21st day of March, 1929.

MAX A. ROSENBERG.